Nov. 6, 1923.
R. LEEDOM
POLE CLEANING AND SHAVING MACHINE
Filed July 21, 1922
1,473,582
2 Sheets-Sheet 1
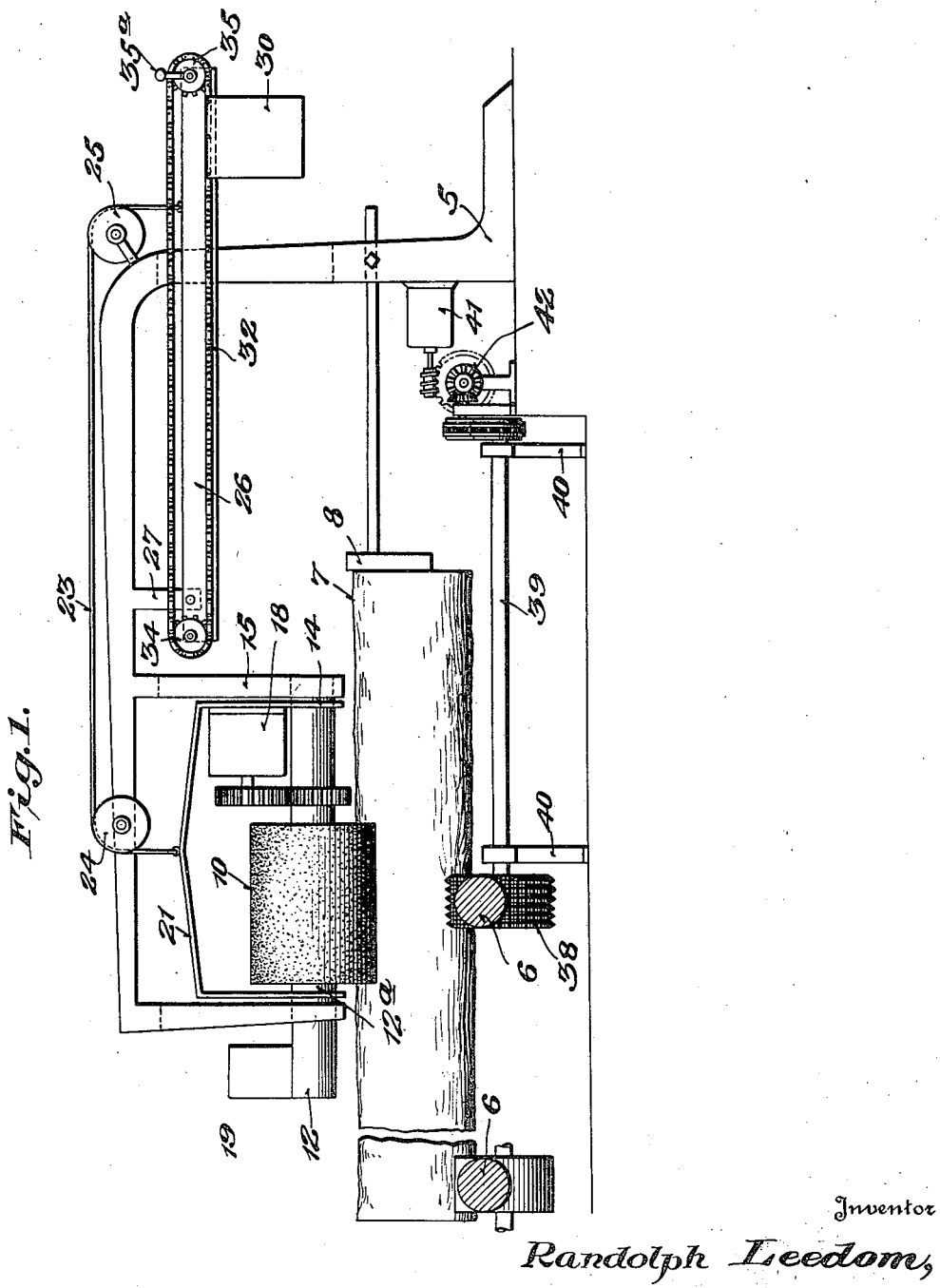
Inventor
Randolph Leedom,
Witness:-
Chas. L. Griesbauer
By
Eugene C. Brown
Attorney Nov. 6, 1923.
R. LEEDOM
1,473,582
POLE CLEANING AND SHAVING MACHINE
Filed July 21, 1922   2 Sheets-Sheet 2
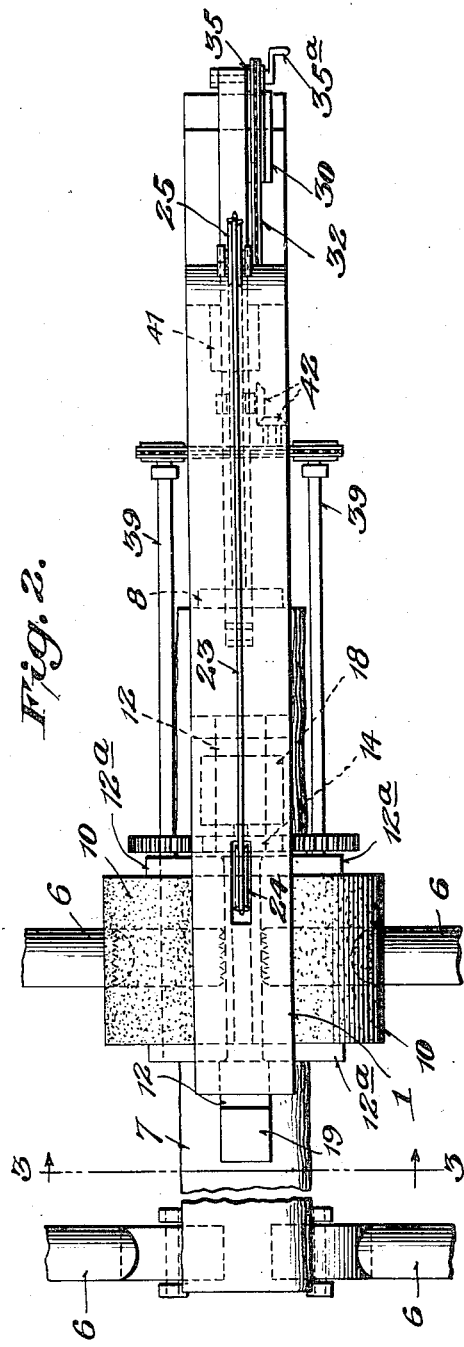
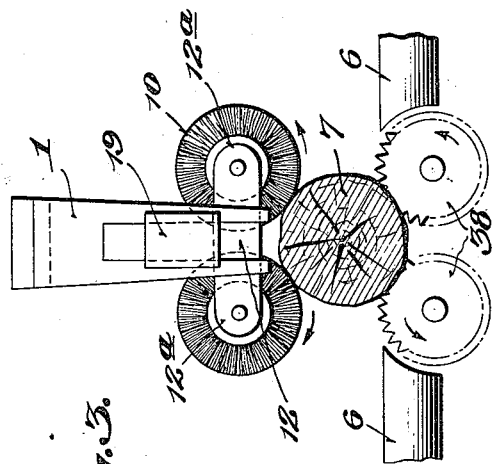
Inventor
Randolph Leedom,
By Eugene E. Brown
Attorney
Witness:
Chas. L. Grieshaver Patented Nov. 6, 1923.

1,473,582

UNITED STATES PATENT OFFICE.

RANDOLPH LEEDOM, OF CLIFTON, NEW JERSEY, ASSIGNOR TO THE WESTERN UNION TELEGRAPH COMPANY, OF NEW YORK, N. Y., A CORPORATION OF NEW YORK.

POLE CLEANING AND SHAVING MACHINE.

Application filed July 21, 1922. Serial No. 576,453.

*To all whom it may concern:*

Be it known that I, RANDOLPH LEEDOM, a citizen of the United States, residing at Clifton, in the county of Passaic and State of New Jersey, have invented certain new and useful Improvements in Pole Cleaning and Shaving Machines, of which the following is a specification.

This invention relates to the preparation of poles such as telegraph poles, for immersion in a preservative bath of a suitable solution or oil such as creosote. In the open tank treatment of poles for the purpose of lessening their liability to decay when set in the ground, it is essential to remove the inner bark and the thin case hardened seasoning shell from a portion of the pole before immersion to insure maximum penetration and absorption along that portion of the pole adjacent the ground line.

The object of this invention is to provide a machine which will remove the bark and shell rapidly under absolute control of the operator so that only a minimum of wood shall be removed and which can be operated while the pole is on skids. A further object is to secure an automatic adjustment of the cutting brushes so that they will conform to varying sizes and taper of the poles and will clean depressions and protuberances both sides of any irregularities in the surface of the pole.

In the accompanying drawings, I have illustrated a machine embodying my invention in which Figure 1 is a side elevation, Fig. 2 is a top plan view and Fig. 3 is a transverse sectional view on the line 3—3 of Fig. 2.

The main frame 5 of the machine is positioned adjacent the skids 6 so that the log 7 may be rolled directly under the cutters with the butt end bearing against the stop 8. The cutters consist of a pair of wire brushes 10, journaled in laterally projecting arms 12ª of supports 12, 14 which are vertically slidable in depending frame guide members 15. The brushes are oppositely driven by an electric motor 18, carried by the support 14, the weight of the motor being counterbalanced by a weight 19.

For the purpose of adjusting the brushes to any desired height in the guides and counterbalancing their weight to any predetermined extent, I attach a bail 21 to the supports which carry the brushes and driving motor, and connect the bail by a cable 23 passing over pulleys 24, 25 to the outer end of a swinging lever 26, pivoted adjacent its inner end to an arm 27. A weight 30, sufficient to counterbalance the brushes and motor is slidable along a flange or oppositely disposed flanges upon the lower side of the lever and is movable along the lever by means of a sprocket chain 32 passing over sprockets 34, 35 journaled at opposite ends of the lever.

When it is desired to remove the bark and shell from a pole positioned as shown, the pressure of the brushes upon the log is adjusted to the proper amount, depending upon the diameter and character of the log, by turning the crank 35ª until the sprocket chain has slid the weight 30 into the corresponding position on the lever 26. The motor 18 is then set in motion and drives the brushes rapidly in opposite directions. The pole is slowly rotated by a pair of spiked disks 38, carried by shafts 39, journaled in standards 40 and driven in the same direction by a motor 41 through suitable gearing 42. As the bark and shell are being cut away the pressure of the brushes may be varied to suit changing conditions by a turn of the crank handle 35ª to shift the position of the weight 30. The position of the stop 8 may be adjusted toward or from the brushes to regulate the cutting operation to any desired point along the pole since this will vary with different sized poles.

Inasmuch as the poles taper along their length and also differ in section at various points, I have provided for the automatic adjustment of the brushes to varying angular positions by means of the floating supports 12 and 14 which can rise and fall in the guides either simultaneously or independently. The brushes therefore rock along their axes as they follow the irregularities of the surface. Furthermore, the opposite rotation of the brushes causes them to clean both sides of the irregularities. As above noted, the amount of wood removed is easily controlled by varying the pressure exerted by the brushes. When a pole is to be rolled into position or removed from the machine, the brushes may be lifted by shifting the counter weight 30 to the outer end of the lever.

I have illustrated an electric motor as the driving means but it will be evident that any other suitable source of power operatively connected to the brushes and to the log-turning disks may be employed.

I claim:—

1. A machine for peeling and shaving logs or poles, comprising means for supporting and rotating a log or pole, a pair of rotatable cutting brushes positioned adjacent the log, a motor operatively connected to the brushes, a movable support carrying said motor and having said brushes journaled therein, a supporting frame having guides for said support, counterbalancing mechanism pivoted in said frame and having a weight adjustable toward or from the pivot and a flexible connection between said mechanism and said support.

2. A machine for peeling and shaving logs or poles, comprising means for supporting a log and rotating it upon a horizontal axis, a supporting frame having guides arranged perpendicular to the log, and peeling and shaving mechanism comprising motor-actuated cutting brushes, a brush support freely movable within said guides in a plane with the axis of the log, an adjustable counterbalancing device pivotally secured to said frame, and a cable connected to said device and to which said brush support is suspended.

3. A machine for peeling and shaving logs or poles, comprising means for supporting a log and rotating it upon a horizontal axis, motor-actuated rotatable cutting brushes positioned adjacent the log, and means for adjustably counterbalancing the brushes to determine the pressure they exert upon the log while permitting their movement in the plane of the axis of the log so that the brushes may conform to the taper and irregularities of the log.

4. A machine for peeling and shaving logs or poles, comprising means for supporting a log or pole, means for rotating the log upon a horizontal axis, a pair of cutting brushes rotatably mounted in a support adjacent the log, a motor carried by said support and operatively connected to and movable with said brushes in the plane of the axis of the log, adjustable means for counterbalancing the weight of said motor and brushes to any desired extent, and a frame acting to guide the movement of the brushes.

In testimony whereof I affix my signature.

RANDOLPH LEEDOM.